(12) United States Patent
Marcinkiewicz et al.

(10) Patent No.: US 7,626,349 B2
(45) Date of Patent: Dec. 1, 2009

(54) LOW NOISE HEATING, VENTILATING AND/OR AIR CONDITIONING (HVAC) SYSTEMS

(75) Inventors: Joseph G. Marcinkiewicz, St. Peters, MO (US); Arthur E. Woodard, Manchester, MO (US); Prakash B. Shahi, St. Louis, MO (US); Mark E. Carrier, Wildwood, MO (US); Michael I. Henderson, North Yorkshire (GB)

(73) Assignee: Emerson Electric Co., St. Louis, MO (US)

( * ) Notice: Subject to any disclaimer, the term of this patent is extended or adjusted under 35 U.S.C. 154(b) by 300 days.

(21) Appl. No.: 11/701,350

(22) Filed: Feb. 1, 2007

(65) Prior Publication Data

US 2008/0185986 A1  Aug. 7, 2008

(51) Int. Cl.
H02P 21/00 (2006.01)
(52) U.S. Cl. .................. 318/400.02; 318/400.32; 318/599
(58) Field of Classification Search ............ 318/400.02, 318/400.32, 400.34, 459, 500, 432, 599
See application file for complete search history.

(56) References Cited

U.S. PATENT DOCUMENTS 5,410,230 A * 4/1995 Bessler et al. ............... 318/471
5,426,354 A * 6/1995 Bausch ................... 318/400.04
5,448,141 A * 9/1995 Kelley et al. ........... 318/400.35
5,969,498 A * 10/1999 Cooke ........................ 318/799
6,326,750 B1   12/2001 Marcinkiewicz
6,756,757 B2   6/2004 Marcinkiewicz et al.
7,208,895 B2   4/2007 Marcinkiewicz et al.
2006/0290302 A1   12/2006 Marcinkiewicz et al.

OTHER PUBLICATIONS

"Closed-Loop Vector Yorque Control," www.worldservo.com/html/features/vector.htm; [retrieved on Nov. 22, 2006]; pp. 1-3.
"Sinewave Commutation," www.worldservo.com/html/features/sine.htm; [retrieved on Nov. 22, 2006]; pp. 1-3.

* cited by examiner

Primary Examiner—Rina I Duda
(74) Attorney, Agent, or Firm—Harness, Dickey & Pierce, P.L.C.

(57) ABSTRACT

A heating, ventilating and/or air conditioning (HVAC) system includes a system controller, a motor controller, an air-moving component, and a permanent magnet motor having a stationary assembly, a rotatable assembly in magnetic coupling relation to the stationary assembly, and a shaft coupled to the air-moving component. The motor controller is configured for performing sinewave commutation in response to one or more control signals received from the system controller to produce continuous phase currents in the permanent magnet motor for driving the air-moving component. By using sinewave commutation (in contrast to square wave commutation), the noise and vibration produced by the HVAC system is markedly reduced.

20 Claims, 4 Drawing Sheets

US 7,626,349 B2

LOW NOISE HEATING, VENTILATING AND/OR AIR CONDITIONING (HVAC) SYSTEMS

FIELD

The present disclosure relates to heating, ventilating and/or air conditioning (HVAC) systems including HVAC systems employing one or more air-moving components such as a blower.

BACKGROUND OF THE INVENTION

The statements in this section merely provide background information related to the present disclosure and may not constitute prior art.

Various types of climate control systems are known in the art for providing heating, ventilating and/or air conditioning (HVAC). Many of these systems employ one or more air-moving components, including blowers (such as air handlers and circulation fans), condenser fans, draft inducers, etc. These air-moving components are commonly driven by electric motors. While single speed and multi-speed motors are sometimes used to drive air-moving components, discrete speed motors have largely been displaced in recent years by variable speed motors.

Variable speed motors for driving air-moving components in HVAC systems commonly employ square wave excitation and control techniques (sometimes referred to as "6-step" commutation). Typically, such variable speed motors use square wave control signals to control the application of positive and negative dc voltages to the motor's three phase windings. At any given time, a positive dc voltage is applied to one of the phase windings, a negative dc voltage is applied to another one of the phase windings, and the third phase winding is unenergized or "open" (the unenergized phase winding is usually not truly left open, but rather "flies" into a catch diode or other device for dissipating residual winding current). By sequentially (and abruptly) rotating the application of positive and negative dc voltages among the three phase windings, a rotating magnetic field is created which causes rotation of the rotor for driving the air-moving component.

FIG. 1 illustrates the phase currents produced in a motor using known square wave commutation techniques (the current offsets are shifted in FIG. 1 to clearly illustrate all three phase currents). Because of the manner in which the phase windings are abruptly switched, with one phase winding unenergized at any given time, the resulting phase currents are discontinuous. As can be seen in FIG. 1, each phase current has a zero voltage level for about one-third of each cycle.

The known square wave commutation techniques and resulting discontinuous phase currents produce relatively high cogging torque, as illustrated in FIG. 2, as well as relatively high operating torque ripple and torque harmonics. This, in turn, produces undesirable acoustic noise and vibration in the motor and thus any HVAC system in which the motor is used. For these reasons, many known HVAC motors couple the rotatable assembly (also referred to as the rotor) to the motor shaft using a mechanical damping material to reduce noise and vibration.

Further, known square wave commutation techniques are considered relatively inefficient, and produce an efficiency loss in the motor on the order of about two percent (2%).

SUMMARY

According to one example of the present disclosure, a heating, ventilating and/or air conditioning (HVAC) system includes a system controller, a motor controller, an air-moving component, and a permanent magnet motor having a stationary assembly, a rotatable assembly in magnetic coupling relation to the stationary assembly, and a shaft coupled to the air-moving component. The motor controller is configured for performing sinewave commutation in response to one or more control signals received from the system controller to produce continuous phase currents in the permanent magnet motor for driving the air-moving component.

According to another example of the present disclosure, a method is provided for driving an air-moving component of a heating, ventilating and/or air conditioning (HVAC) system in response to a control signal. The HVAC system includes a permanent magnet motor having a stationary assembly and a rotatable assembly in magnetic coupling relation to the stationary assembly. The rotatable assembly is coupled in driving relation to the air-moving component. The method includes receiving at least one control signal from a system controller, and performing sinewave commutation in response to the control signal received from the system controller to produce continuous phase currents in the permanent magnet motor for driving the air-moving component.

According to yet another example of the present disclosure, a blower assembly for a heating, ventilating and/or air conditioning (HVAC) system includes a motor controller, a blower, and a permanent magnet motor having a stationary assembly, a rotatable assembly in magnetic coupling relation to the stationary assembly, and a shaft coupled to the blower. The motor controller is configured for performing sinewave commutation in response to one or more control signals received from a system controller to produce continuous phase currents in the permanent magnet motor for driving the blower.

According to still another example of the present disclosure, a motor and controller assembly for HVAC systems includes a motor controller configured for receiving one or more control signals from an HVAC system controller, and for performing sinewave commutation in response to the received control signal(s) to produce continuous phase currents in the permanent magnet motor for driving an air-moving component when the air-moving component is coupled in driving relation to the permanent magnet motor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the scope of the present disclosure nor its potential applications and uses.

Figure 3:
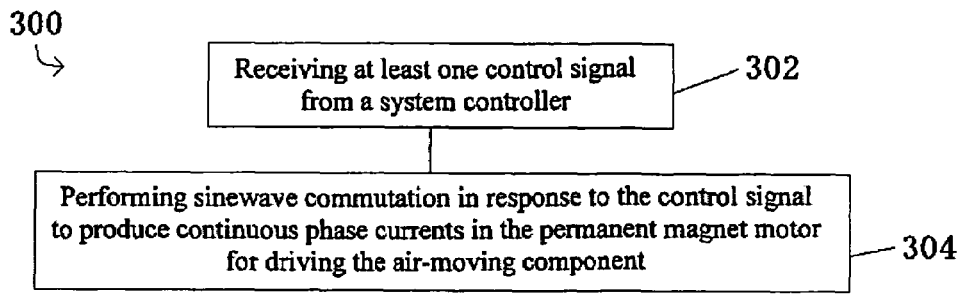
FIG. 3 is a block diagram of a method for driving an air-moving component of an HVAC system according to one embodiment of the present disclosure.

According to one aspect of the present disclosure, a method is provided for driving an air-moving component of a heating, ventilating and/or air conditioning (HVAC) system in response to a control signal. The HVAC system includes a permanent magnet motor having a stationary assembly (stator) and a rotatable assembly (rotor) in magnetic coupling relation to the stationary assembly. The rotatable assembly is coupled in driving relation to the air-moving component. As illustrated in FIG. 3, the method 300 includes receiving at least one control signal from a system controller (block 302), and performing sinewave commutation in response to the control signal received from the system controller to produce continuous phase currents in the permanent magnet motor for driving the air-moving component (block 304). Employing sinewave commutation in the HVAC system provides a number of advantages, including reducing the operating torque ripple of the permanent magnet motor, especially as compared to prior art motors that employ square wave commutation techniques. As a result, the acoustic noise produced by the HVAC system is likewise reduced.

One example of a system for practicing the method 300 of FIG. 3 will now be described with reference to FIG. 4. It should be understood, however, that other systems may be employed for practicing the method of FIG. 3 without departing from the scope of this disclosure.

Figure 4:
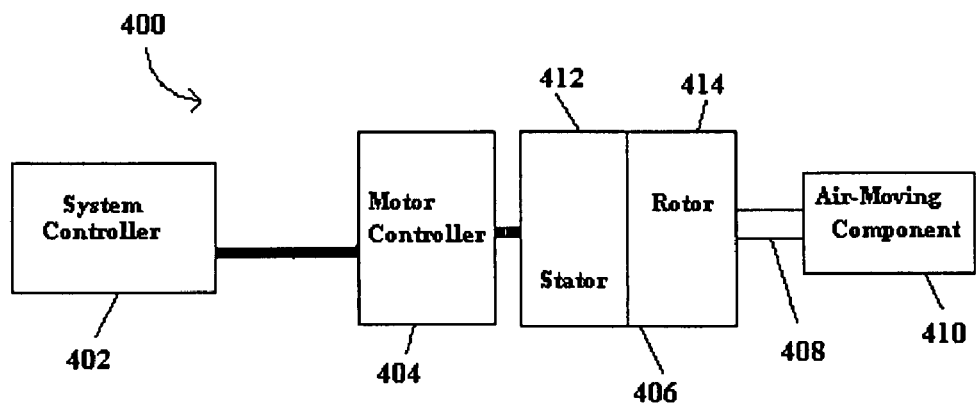
FIG. 4 is a block diagram of an HVAC system having a motor and motor controller for driving an air-moving component according to another embodiment of the present disclosure.

As shown in FIG. 4, the system 400 includes a system controller 402, a motor controller 404, a permanent magnet motor 406 and an air-moving component 410. The permanent magnet motor 406 includes a shaft 408, a stationary assembly 412 and a rotatable assembly 414. The rotatable assembly 414 is magnetically coupled to the stationary assembly 412. The rotatable assembly 414 is coupled to the air-moving component, in this particular example via the shaft 408, for driving rotation of the air-moving component 410.

The motor controller 404 is configured for performing sinewave commutation in response to one or more (analog or digital) control signals received from the system controller 402 to produce continuous phase currents in the permanent magnet motor 406 for driving the air-moving component 410. As shown in FIG. 4, the motor controller 404 is coupled to the system controller 402 for receiving control signals directly from the system controller 402. Such control signals may represent, for example, a desired torque or speed of the motor 406. Alternatively, the control signals may represent a desired airflow to be produced by the air-moving component 410.

For the particular embodiment shown in FIG. 4, the motor controller 404 is configured for performing sinewave commutation using vector control to ensure the continuous phase currents produced in the permanent magnet motor are substantially sinusoidal. As appreciated by those skilled in the art, using vector control techniques (which involve transformation(s) to different frame(s) of reference) typically requires determining the rotor position. This can be accomplished using sensor(s) or sensorless techniques.

In the case where the air-moving component 410 is a blower and the motor controller 404 is configured to operate in a constant airflow mode (also called a constant cubic feet per minute (CFM) mode, in which the blower is controlled so as to provide a desired level of airflow), a vector control architecture provides a substantially constant torque over the operating range of the permanent magnet motor. Therefore, the constant airflow control laws need not address torque changes that could otherwise occur with changes in the speed, etc. Moreover, due to the dynamic response of the vector control architecture, there is substantially no interaction with the constant airflow control loop. Additional details regarding sensorless control techniques and sinewave commutation using vector control (as well as speed, torque and constant airflow control schemes, discussed below) are disclosed in U.S. Pat. Nos. 6,326,750, 6,756,757, 7,208,895 and 7,342,379, the entire disclosures of which are incorporated herein by reference.

The air-moving component 410 can be a blower, such as an air handler or circulation fan, an indoor or outdoor condenser fan, a draft inducer fan, etc. It should be understood, however, that other types of air-moving components can be coupled in driving relation to the rotatable assembly 414 without departing from the scope of this disclosure. Further, the system controller 402 may be a thermostat, an additional control module in communication with a thermostat, or a standalone controller for the HVAC system 400.

In the embodiment of FIG. 4, the permanent magnet motor 406 is a variable speed brushless permanent magnet (BPM) motor, such as a back-electromagnetic field (back-emf) BPM motor having a segmented stator. It should be understood, however, that other types of permanent magnet motors (including motors with embedded or surface magnets on the rotor or the stator, motors with segmented or non-segmented stators, and discrete speed(s) motors) can be employed without departing from the scope of this disclosure.

Figure 5:
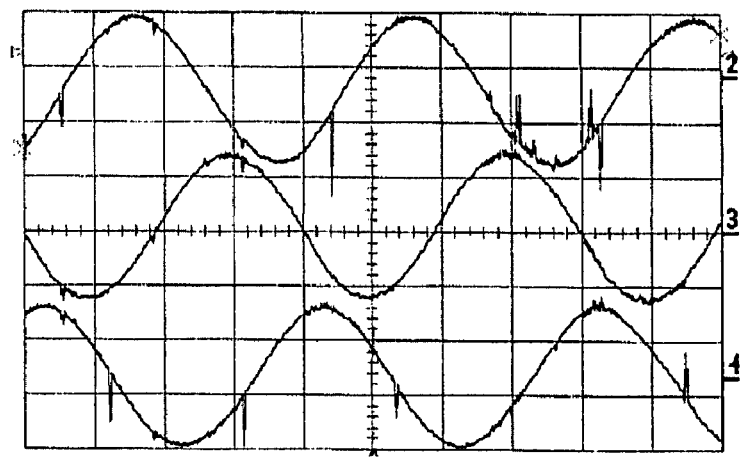
FIG. 5 is a graph of the continuous and substantially sinusoidal phase currents produced in the permanent magnet motor of FIG. 4 using sinewave commutation techniques.

In the specific embodiment of FIG. 4, the stationary assembly 412 includes three phase windings (not shown) and the motor controller 404 is configured for energizing all three of the phase windings at the same time. FIG. 5 illustrates the continuous and substantially sinusoidal phase currents produced in the three phase windings of the stationary assembly 412 (the current offsets are shifted in FIG. 5 to clearly illustrate all three phase currents). The phase currents are continuous because they each have substantially no period of zero voltage. The phase currents illustrated in FIG. 5 are not perfectly sinusoidal due to, among other things, the presence of harmonics in the motor's back emf. If desired, the motor controller 404 can be configured (using known techniques) to produce continuous phase currents that cancel effects of harmonic content in the permanent magnet motor's back emf. Additional details regarding cancelling the effects of harmonic content in the back emf are disclosed in the applications and patents referenced above.

By using sinewave commutation in the motor controller 404, the efficiency of the motor 406 (and thus the system 400)

is improved as compared to the square wave commutation techniques employed in the prior art. Further, because of the continuous phase currents produced in the permanent magnet motor, the resulting operating torque is substantially free of torque ripple that could otherwise produce acoustic noise and vibration. As a result, in the particular embodiment shown in FIG. 4, the rotatable assembly 414 is coupled to the shaft 408 without using damping materials. Accordingly, the manufacturing cost of the permanent magnet motor 406 is reduced as compared to motors requiring damping materials to reduce acoustic noise. It should be understood, however, that damping materials may still be employed, if desired, without departing from the scope of this disclosure.

Figure 1:
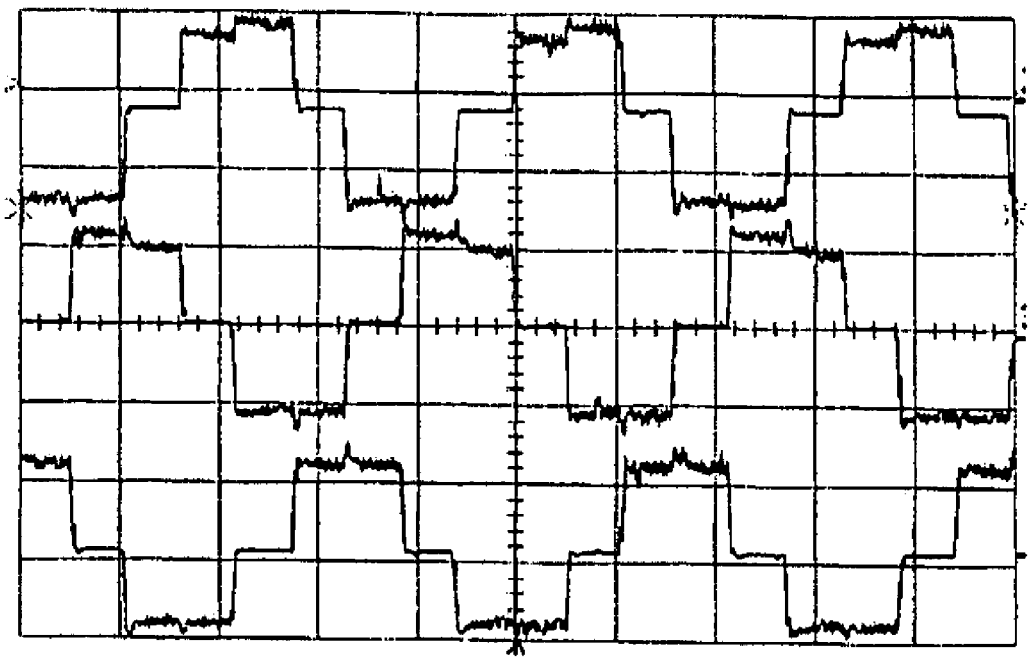
FIG. 1 is a graph of discontinuous phase currents produced in a variable speed motor under square wave commutation control according to the prior art.
Figure 2:
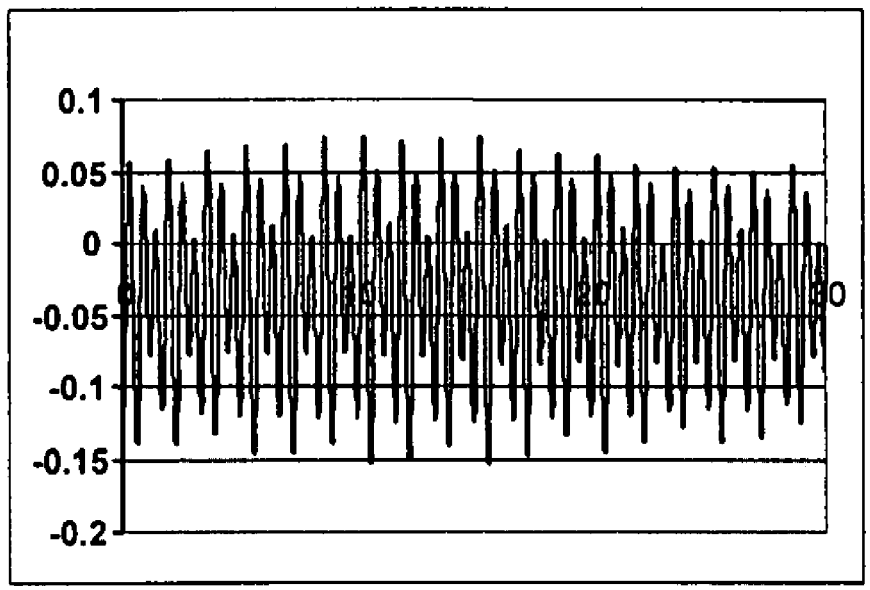
FIG. 2 is a graph illustrating the relatively high cogging torque of a prior art variable speed HVAC motor under square wave commutation control.
Figure 6:
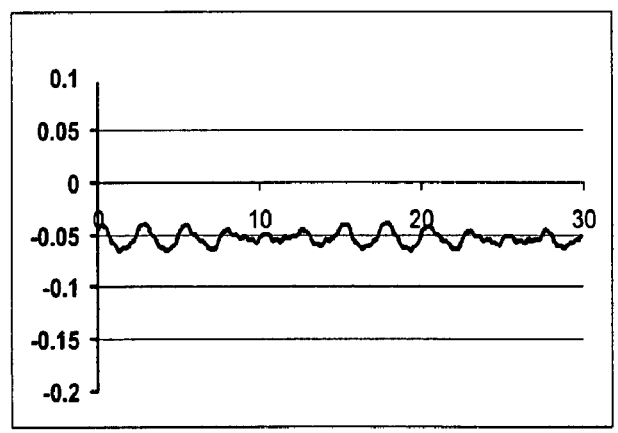
FIG. 6 is a graph illustrating the relatively low cogging torque of the permanent magnet motor shown in FIG. 4 under sinewave commutation control.

Additionally, the motor 406 shown in FIG. 4 produces relatively little cogging torque, as shown in FIG. 6, particularly as compared to the cogging torque shown in FIG. 2 for prior art motors under square wave commutation control. This also helps reduce acoustic noise and vibration in the HVAC system 400.

Figure 7:
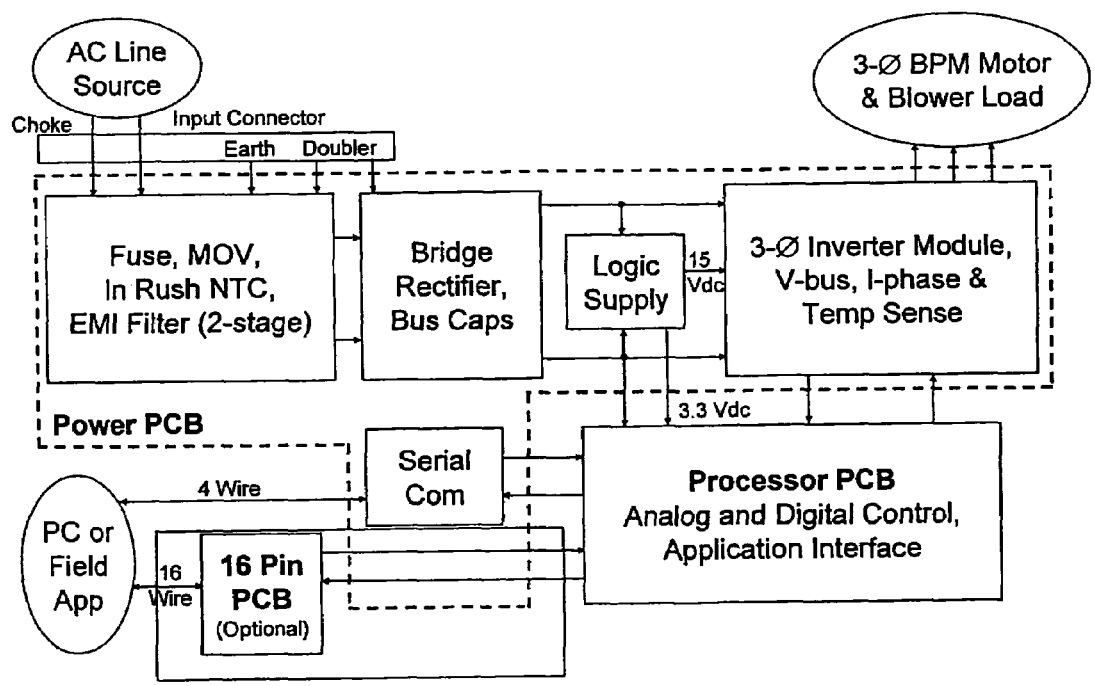
FIG. 7 is a block diagram of an HVAC blower assembly according to another embodiment of the present disclosure.
Figure 8:
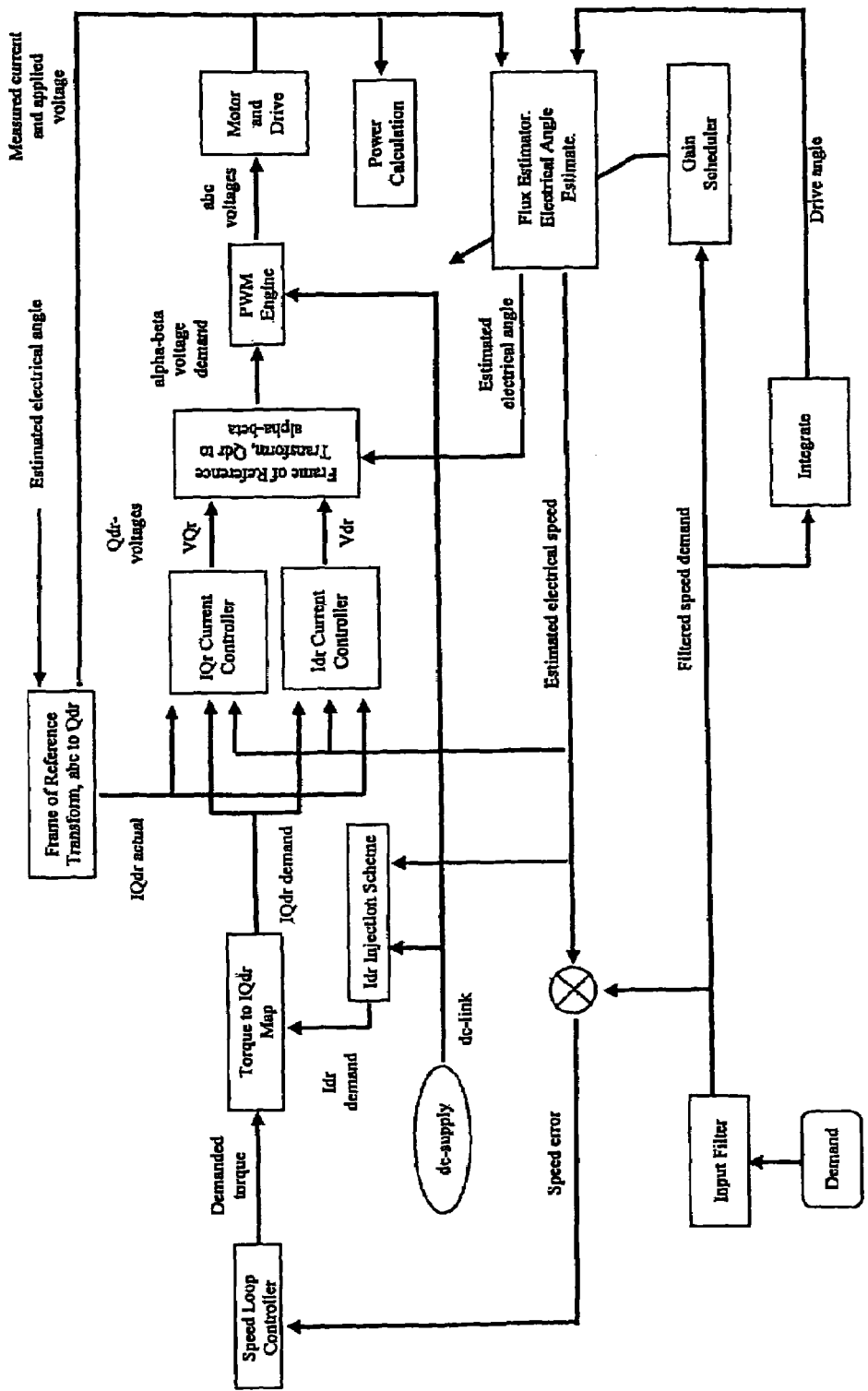
FIG. 8 is a block diagram of a sensorless vector control scheme performed by the controller shown in FIG. 7.

FIG. 7 illustrates a specific embodiment of the HVAC system of FIG. 4 in which the air-moving component is a blower. In the embodiment of FIG. 7, the system controller is identified as a "PC or Field" application. FIG. 8 provides a block diagram of the sensorless vector control performed by the processor printed circuit board (PCB) shown in FIG. 7.

Those skilled in the art will recognize that various changes can be made to the exemplary embodiments and implementations described above without departing from the scope of the present disclosure. Accordingly, all matter contained in the above description or shown in the accompanying drawings should be interpreted as illustrative and not in a limiting sense.

What is claimed is:

1. A heating, ventilating and/or air conditioning (HVAC) system comprising a system controller, a motor controller, an air-moving component, and a permanent magnet motor having a stationary assembly, a rotatable assembly in magnetic coupling relation to the stationary assembly, and a shaft coupled to the air-moving component, wherein the motor controller is configured for performing sinewave commutation, using independent values of Q and d axis currents, in response to one or more control signals received from the system controller to produce continuous phase currents in the permanent magnet motor for driving the air-moving component.

2. The HVAC system of claim 1 wherein the stationary assembly includes a plurality of phase windings and the motor controller is configured for energizing all of the phase windings at the same time.

3. The HVAC system of claim 2 wherein the continuous phase currents are substantially sinusoidal.

4. The HVAC system of claim 3 wherein the rotatable assembly is coupled to the shaft without using a damping material.

5. The HVAC system of claim 3 wherein the air-moving component is a blower.

6. The HVAC system of claim 3 wherein the air-moving component is a draft inducer.

7. The HVAC system of claim 3 wherein the air-moving component is a condenser fan.

8. The HVAC system of claim 3 wherein the permanent magnet motor is a brushless permanent magnet (BPM) motor.

9. The HVAC system of claim 8 wherein the BPM motor is a back-emf BPM motor.

10. The HVAC system of claim 3 wherein the system controller includes a thermostat.

11. The HVAC system of claim 3 wherein the at least one control signal from the system controller represents a desired airflow for the air-moving component.

12. The HVAC system of claim 3 wherein the at least one control signal from the system controller represents a desired torque or speed of the permanent magnet motor.

13. The HVAC system of claim 3 wherein the motor controller is configured for performing sinewave commutation using vector control.

14. The HVAC system of claim 13 wherein the motor controller is configured for sensorlessly estimating a position of the rotatable assembly using a flux estimate produced using energization feedback from the permanent magnet motor.

15. The HVAC system of claim 3 wherein the motor controller is configured to produce continuous phase currents that cancel effects of harmonic content in the permanent magnet motor's back emf.

16. A blower assembly for a heating, ventilating and/or air conditioning (HVAC) system, the blower assembly comprising a motor controller, a blower, and a permanent magnet motor having a stationary assembly, a rotatable assembly in magnetic coupling relation to the stationary assembly, and a shaft coupled to the blower, wherein the motor controller is configured for performing sinewave commutation, using independent values of Q and d axis currents, in response to one or more control signals received from a system controller to produce continuous phase currents in the permanent magnet motor for driving the blower.

17. The blower assembly of claim 16 wherein the motor controller is configured for sensorlessly estimating a position of the rotatable assembly using a flux estimate produced using energization feedback from the permanent magnet motor.

18. The blower assembly of claim 17 wherein the motor controller is configured to produce continuous substantially sinusoidal phase currents that cancel harmonic content in the permanent magnet motor's back emf.

19. A method for driving an air-moving component of a heating, ventilating and/or air conditioning (HVAC) system in response to a control signal, the HVAC system including a permanent magnet motor having a stationary assembly and a rotatable assembly in magnetic coupling relation to the stationary assembly, said rotatable assembly coupled in driving relation to the air-moving component, the method comprising receiving at least one control signal from a system controller, and performing sinewave commutation, using independent values of Q and d axis currents, in response to the at least one control signal received from the system controller to produce continuous currents in the permanent magnet motor for driving said air-moving component.

20. The method of claim 19 wherein the air-moving component is a blower, and wherein receiving includes receiving at least one control signal representing a desired airflow for the blower, a desired torque of the permanent magnet motor, or a desired speed of the permanent magnet motor.

* * * * *